Jan. 10, 1967 H. C. SEABECK 3,296,881
ANTI-BACKLASH GEAR
Filed June 29, 1964 5 Sheets-Sheet 1

INVENTOR.
HOWARD C. SEABECK
BY
ATTORNEYS.

Jan. 10, 1967 H. C. SEABECK 3,296,881
ANTI-BACKLASH GEAR
Filed June 29, 1964 5 Sheets-Sheet 2

INVENTOR.
HOWARD C. SEABECK
BY
ATTORNEYS.

Jan. 10, 1967     H. C. SEABECK     3,296,881
ANTI-BACKLASH GEAR
Filed June 29, 1964     5 Sheets-Sheet 3
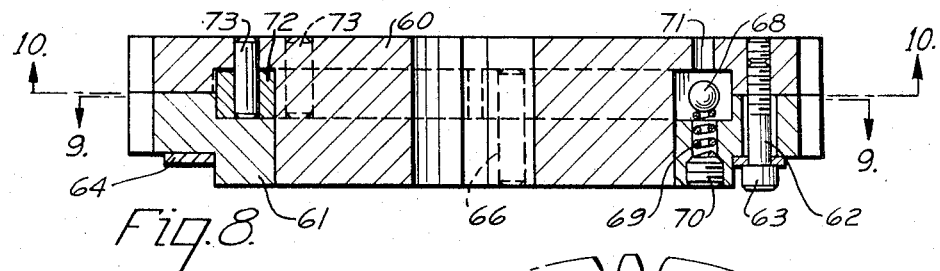
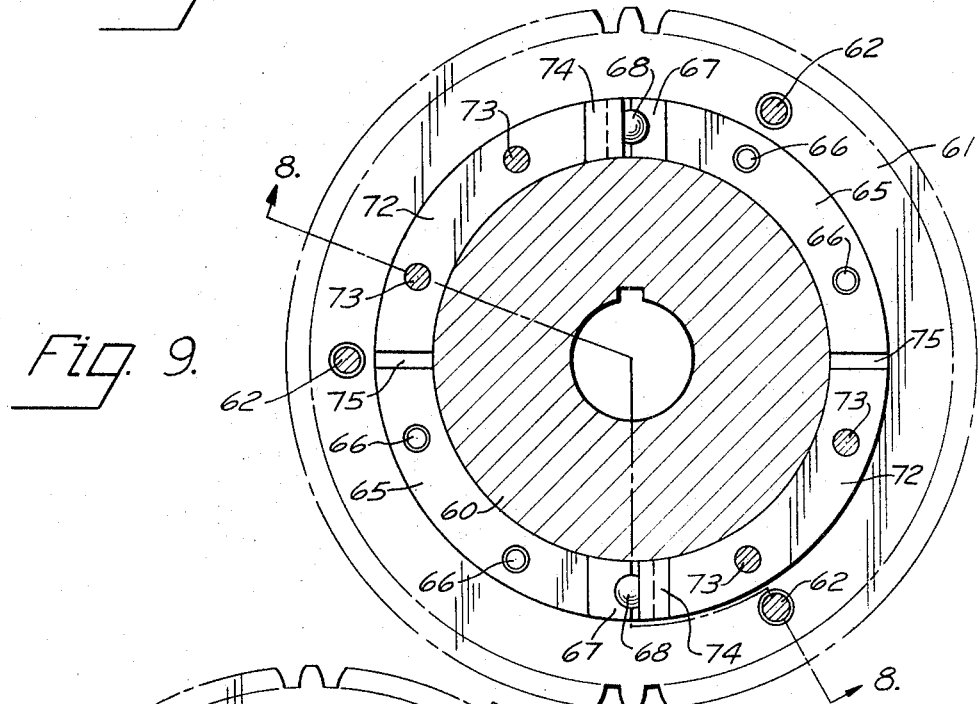
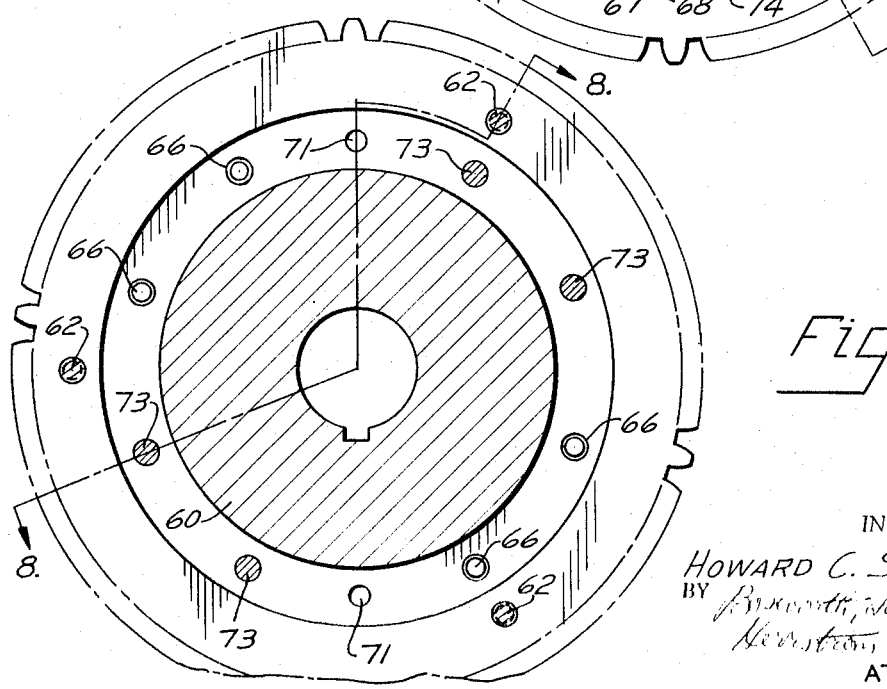
INVENTOR.
HOWARD C. SEABECK
ATTORNEYS.

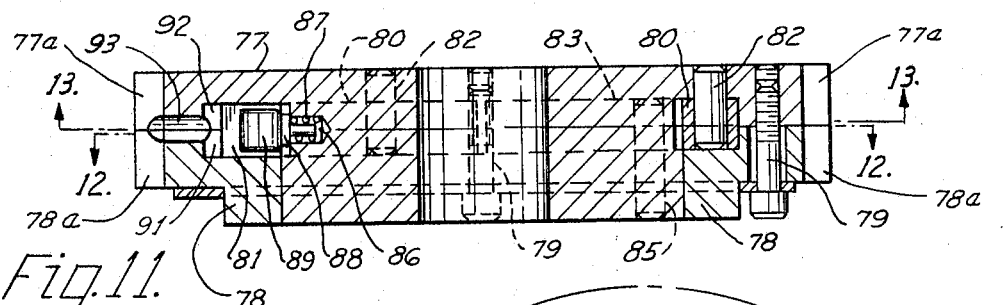
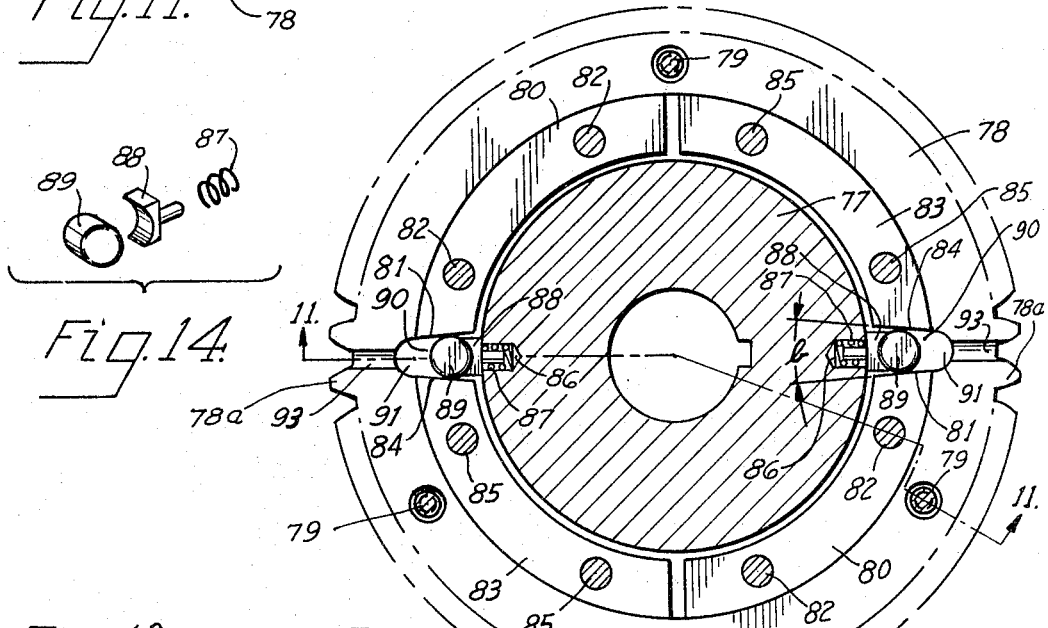
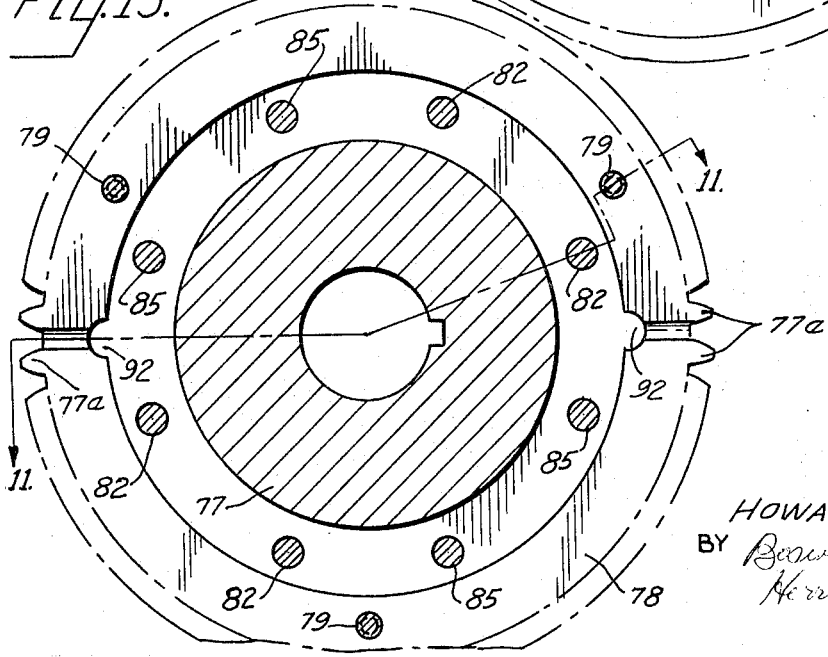

Jan. 10, 1967   H. C. SEABECK   3,296,881
ANTI-BACKLASH GEAR

Filed June 29, 1964   5 Sheets-Sheet 5

INVENTOR.
HOWARD C. SEABECK
BY
ATTORNEYS.

United States Patent Office 3,296,881
Patented Jan. 10, 1967

3,296,881
ANTI-BACKLASH GEAR
Howard C. Seabeck, Lyndhurst, Ohio, assignor to The Cleveland Twist Drill Company, Cleveland, Ohio, a corporation of Ohio
Filed June 29, 1964, Ser. No. 378,701
18 Claims. (Cl. 74—440)

This invention relates to a self-contained sectional gear with built-in provision for eliminating backlash in which the anti-blacklash mechanism tenaciously maintains its working position whether the gear is stationary or in movement and, if the latter, without regard to the direction of its rotation.

Sectional gears with anti-backlash features have long been known: see, for example, U.S. Patent 1,334,517 to Bryan, U.S. Patent 1,968,338 to Earles and U.S. Patent 2,262,330 to MacNeil. In general, prior gears of this type have been designed for rotation in one direction only, either clockwise or counterclockwise. Where such a gear has been susceptible of being rotated in both directions, it has usually been open to the criticism that the anti-backlash mechanism has been incapable of maintaining itself in working position, especially at times when the gear is stationary. If the latter is the case, any lack of readiness of the anti-backlash mechanism has usually resulted, because of inertia, friction and like factors, in a delay that has permitted at least transient backlash immediately following a period of idleness.

A principal object of the present invention is to overcome these and other drawbacks characteristic of prior types of anti-backlash gears and thereby make possible the use of improved anti-backlash gearing in precision apparatus, wherein even transient backlash cannot be tolerated if it is possible to avoid it. To that end, the invention provides for the incorporation in such apparatus of anti-backlash mechanism that is intrinsically capable of being tenaciously maintained in operative readiness; viz, in working position, even when the gearing system itself is stationary. As an incident thereto, the invention further provides a marked reduction in the formal rate of wear, at least under ordinary loads, in the anti-backlash mechanism itself. Together, these features make for minimization and in a sense the virtual elimination of backlash, from start up to shutdown, in precision apparatus.

Other objects, advantages and features of the invention will be apparent from the description which follows and from the accompanying drawings, in which:

FIGURES 1, 5, 8, 11 and 15 are transverse sections through five different anti-backlash gears within the purview of the invention, all such sections being on planes paralleling the axes of rotation of the respective gears.

FIGURES 2, 6, 9 and 12 are respectively sections on lines 2—2, 6—6, 9—9 and 12—12 of FIGURES 1, 5, 8 and 11 showing mainly the inner faces of the auxiliary gear members, seen as if from above.

FIGURES 3, 7, 10 and 13 are respectively sections on lines 3—3, 7—7, 10—10 and 13—13 of FIGURES 1, 5, 8 and 11 showing the inner faces of the main gear members, see as if from below.

FIGURES 4, 14 and 17 are fragmentary views: FIGURES 4 and 14 have to do with parts seen from above in FIGURES 2 12, respectively, and FIGURE 17 is a detail directed to a modification.

Figure 1:
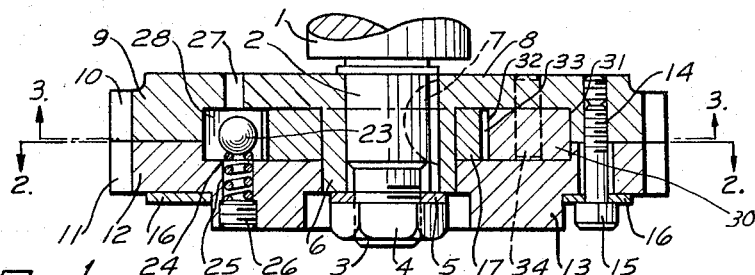

The self-contained anti-backlash gear illustrated in FIGURES 1 to 4 is represented, largely for reasons of convenience, as in horizontal position but may be used, if desired, in inclined or vertical position. Shaft 1, on which it is mounted, has a stepped extension 2 the outer end 3 of which is threaded to accommodate a retaining nut 4. A conventional metal washer 5 intervenes between nut 4 and the outer end of an internally slotted sleeve-like hub 6 forming part of the gear. Key 7 extends into a recess in shaft extension 2 from the slot in hub 6, which is integral with the main gear member.

Figure 2:
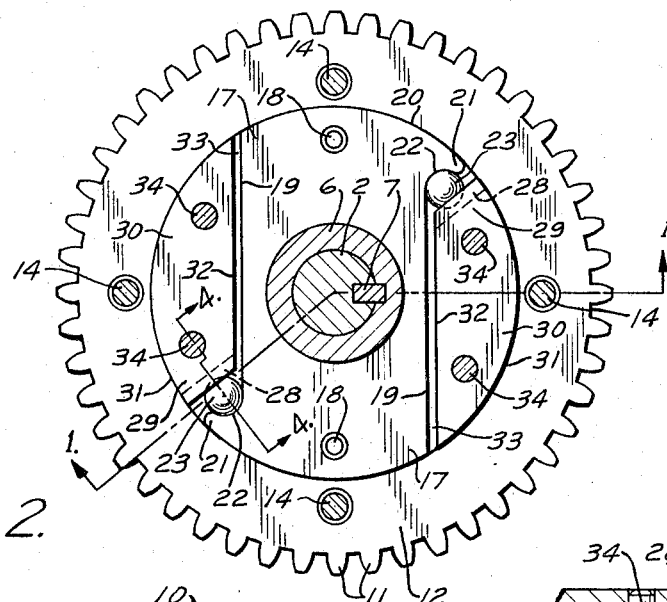
Figure 4:
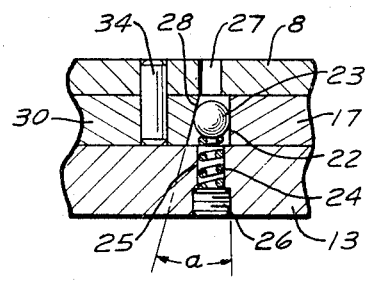
Figure 3:
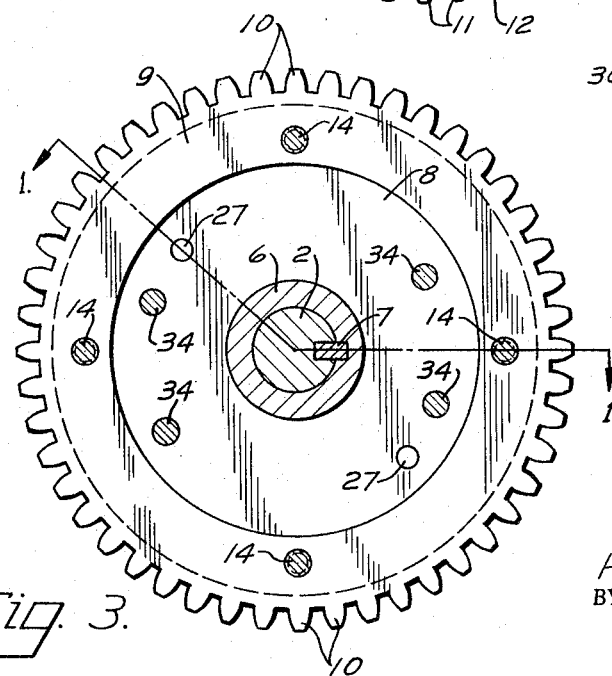

Main gear member 8, seen in bottom plan in FIGURE 3, is provided with an inwardly extending annular flange 9 in the periphery of which are formed gear teeth 10. Seen in top plan in FIGURE 2 are like gear teeth 11 formed in the periphery of an inwardly extending annular flange 12 on auxiliary gear member 13. The relationship between hub 6 and flange 9 is such as to produce therebetween a shallow annular recess on the inside face of main gear member 8. Similarly, the relationship between hub 6 and peripheral flange 12 is such as to produce between them a shallow annular recess on the inside face of auxiliary gear member 13. These recesses are of the same diameter; accordingly, when the main and auxiliary gear members are placed together, the two recesses form a closed annular chamber within the gear, such chamber appearing to the best advantage in the left central portion of FIGURE 1. The two gear members are held together by four screws 14 the heads 15 of which bear against a washer-like metal annulus 16 in engagement with the outer face of auxiliary gear member 13.

Rigidly attached to auxiliary gear member 13 but disposed in such closed annular chamber is a centrally located double-ended wedging member 17 the two opposed ends of which are largely segmental in shape: see FIGURE 2. Holding it in place are two pins 18 (not seen in FIGURE 1) that extend from the auxiliary gear member into the wedging member. Each of the two pins is held by a driven fit in auxiliary gear member 13. Each of the two projects upward into wedging member 17, wherein it is frictionally held. Their chamfered upper ends appear in FIGURE 2.

Central wedging member 17 is characterized, in the form shown in FIGURE 2, by two straight sides 19 connected by arcuate ends 20. Each of the latter has a radius of curvature slightly less than the radius of the closed chamber formed as described above by the opposed recesses in main gear member 8 and auxiliary gear member 13. Disposed diametrically opposite each other but forming parts of wedging member 17 are two S-shaped appendages 21: see FIGURE 2. On the inside end faces of S-shaped appendages 21 are semi-cylindrical surfaces 22, one on each, that serve as guide channels for the locking balls 23 appearing in FIGURES 1, 2 and 4. Guide channels 22 extend perpendicularly to the general plane of wedging member 17: see the showing in FIGURE 4.

As appears therefrom, locking balls 23 are backed up and urged toward main gear member 8 by light coil springs 24. The latter are housed in bores 25 drilled through auxiliary gear member 13. The outer ends of bores 25 are tapped to receive set screws 26 that not only close the ends of the bores but act as seats for springs 24. In main gear member 8, in alignment with bores 25 in auxiliary gear member 13, are access bores 27: see FIGURES 1 and 4.

Coacting with locking balls 23 on the sides thereof away from guide channels 22 are inclined planar surfaces 28 on the cut-away ends 29 of two generally segmental wedging members 30. These wedging members, which are rigidly affixed to main gear member 8, are disposed laterally of central wedging member 17. Diametrically opposite portions thereof are undercut to give the configuration illustrated in FIGURE 4. The inclined surfaces 28 so produced are in juxtaposition to the semicylindrical guide channels 22 in S-shaped appendages 21 on central wedging member 17, forming therewith the generally wedge-shaped opening seen in FIGURE 4.

In a construction of this kind in which central wedging member 17 is of conjugate form (such for instance as that shown in FIGURE 2) lateral wedging members 30 will of course be confined to the segmental spaces that lie outwardly of straight sides 19 of central wedging member 17. Accordingly, lateral wedging members 30 will ordinarily be characterized by arcuate outside edges 31 with the same radius of curvature as arcuate ends 20 on central wedging member 17 and straight inside edges 32 that are of the nature of chords. Inside edges 32 will normally be separated by spaces 33 from the straight sides 19 of central wedging element 17: see FIGURES 1 and 2. To hold lateral wedging members 30 rigidly in place on main gear member 8, each is provided with two pins 34 similar to the pins 18 employed as described above in the case of central wedging member 17.

It will be evident from the foregoing that coil springs 24 tend to bias locking balls 23 into contact with inclined surfaces 28. They may put light, medium or heavy pressure thereon so long as they exert enough force at the outset to bring about the desired contact. Thereafter, provided angle $a$ (FIGURE 4) is not less than about 1° and not more than about 12°, locking balls 23 will not merely engage inclined surfaces 28 but will adhere tenaciously to them regardless of the position of the gear in the installation in which it is used and without regard to whether the latter is in or out of operation at any given time.

Once locking balls 23 have moved into locking position, they will persist in it notwithstanding the effect of such factors as the force of gravity. The persistent hold thus brought about is so tenacious that after locking balls 23 have moved into position it becomes virtually impossible to dislodge them except by means of forcing tools, such, for example, as a screwdriver, inserted through access openings 27. Unless and until this is done, locking balls 23 will continue to urge central wedging member 17 and lateral wedging members 30 in opposite directions, thus forestalling the development of backlash.

As a practical matter, backlash is all but completely eliminated in this embodiment of the invention. Initially there is no backlash; if such develops due to wear, it is likely to be only of the order of a few thousandths of an inch. Whether the gear as a whole is stationary or rotating, locking balls 23 remain at all times in working position. The direction of rotation is unimportant, for the relationship between wedging members 17 and 30 and therefore between gear members 8 and 13 is maintained without regard to the direction. Locking balls 23 do not return to idle position unless dislodged manually as above described.

Figure 5:
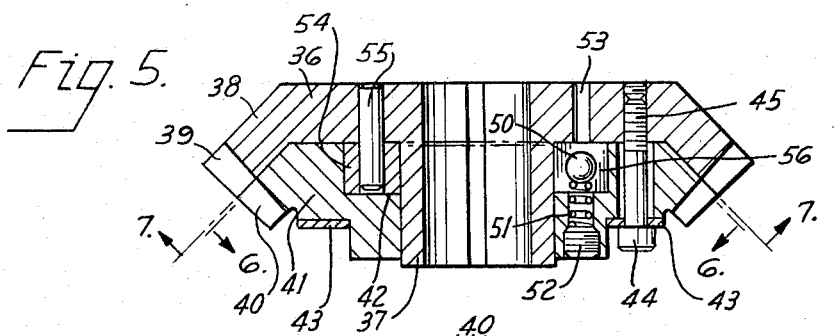
Figure 6:
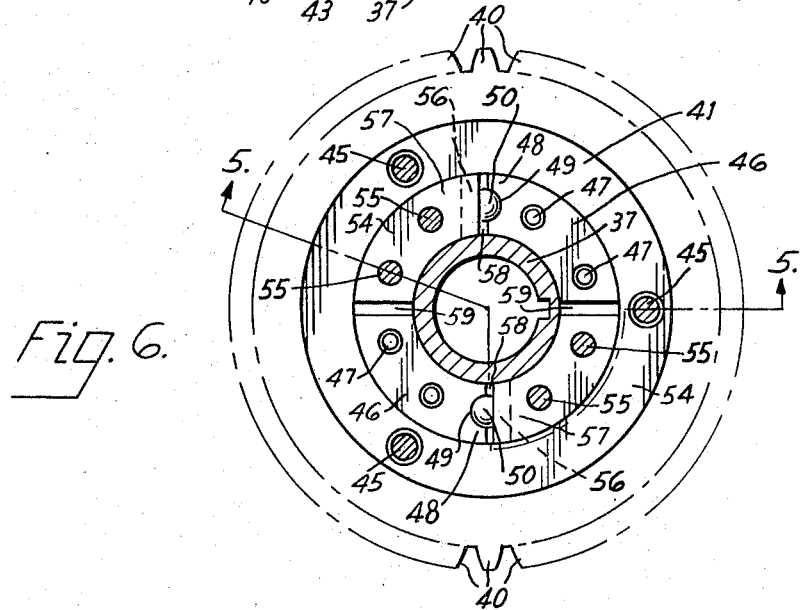
Figure 7:
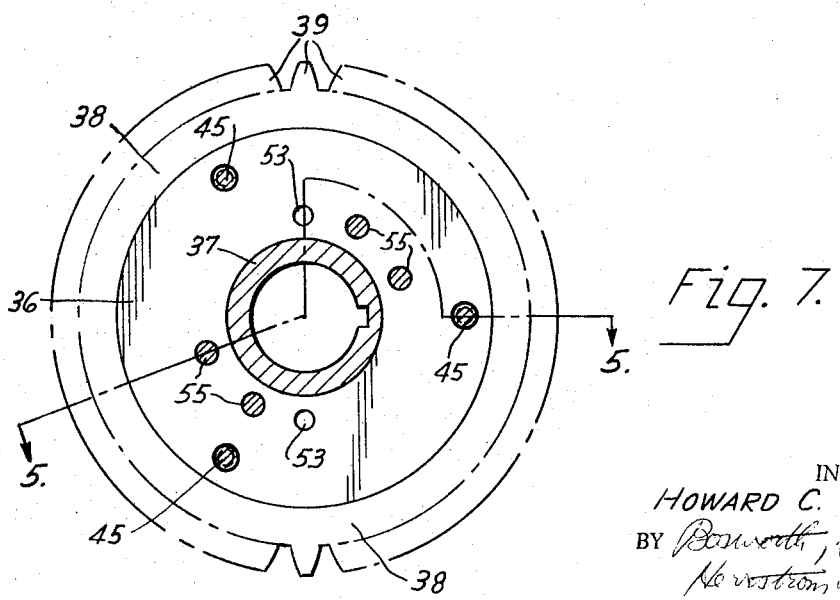

FIGURES 5, 6 and 7 show a second embodiment of the invention, one in which the gear takes the form of a bevel gear. As best appears from FIGURE 5, main gear member 36 has a sleeve-like hub 37 and an angled peripheral flange 38 of which teeth 39 form part. In alignment with the latter are teeth 40 on beveled auxiliary gear member 41. The latter is recessed as indicated in the right central portion of FIGURE 5 in such manner as to form an annular chamber inwardly of hub 42. On the outside face of auxiliary gear member 41 is a washer-like annulus 43 against which bear the heads 44 of the three screws 45 used to hold auxiliary gear member 41 to main gear member 36. By means thereof the auxiliary and main gear members are drawn together and securely fastened to each other.

Located in the above-mentioned annular chamber in auxiliary gear member 41 are four segmental wedging members two of which are attached to the main gear member and two of which are attached to the auxiliary gear member. Those attached to the auxiliary gear member, which are the ones designated 46 in the drawings, take the form of detachable elements of arcuate shape held in place by pins 47 similar to pins 18 in the previously described embodiment of the invention. In such wedging elements 46 the two diametrically opposite ends indicated at 48 are provided with semi-cylindrical channels 49 that extend perpendicularly to the cleavage plane of the gear as a whole: see FIGURE 6. As in the embodiment of the invention illustrated in FIGURES 1 to 4, ends 48 may be and preferably are hardened in any suitable fashion.

Forming part of the anti-backlash mechanism shown in FIGURES 5 to 7 are the locking balls 50. They are adapted to bear against and be guided in and by the side walls of channels 49. They are backed by coil springs 51 the outer ends of which seat on set screws 52. The latter are threaded into tapped bores in hub 42 of auxiliary gear member 41. In alignment therewith, but in main gear member 36, are access openings 53 similar to access openings 27 in the previously described embodiment of the invention.

Although affixed to auxiliary gear member 41 and disposed in the annular chamber formed therein, wedging elements 46 are located on opposite sides of hub 37 on main gear member 36. In the same annular chamber but in zones 90° removed are two similar detachable wedging elements 54 both of which are affixed to main gear member 36. They are pinned to it by pins 55. As indicated in FIGURE 6, wedging elements 54 are characterized by inclined under cut surfaces 56 formed in hardened ends 57. Together with wedging elements 50, they fill the annular chamber in auxiliary gear member 41 save only for relatively narrow spaces such as are indicated at 58.

A third embodiment of the invention is shown in FIGURES 8, 9 and 10, in which the main and auxiliary gear members are respectively designated 60 and 61. They are held together by three screws 62 the heads 63 of which bear against a washer-like annulus 64. As in the embodiment of the invention shown in FIGURES 5 to 7, four segmental wedging elements of arcuate shape are employed of which two are attached to auxiliary gear member 61. The wedging elements 65 so attached to auxiliary gear member 61 are held to it by pins 66, two for each wedging element. Pins 66, which are forcibly driven into auxiliary gear member 61, may be held by a friction fit in wedging elements 65.

In two diametrically opposite zones that appear in FIGURE 9 in the six- and twelve-o'clock positions, like ends of wedging elements 65 are provided with hardened metal wear shoes 67. To accommodate locking balls 68, each of these shoes is formed with a semi-cylindrical surface that serves as a guide channel for the locking ball associated with it. Locking balls 68 are backed by the coil springs and plugs respectively indicated at 69 and 70. They are accessible from openings 71 in main gear member 60 in alignment with the openings in auxiliary gear member 61 in which springs 69 are received.

Attached to main gear member 60 are the two wedging elements 72, held in place on it by pins 73. At the ends thereof which come into contact with locking balls 68, wedging elements 72 are equipped with hardened metal wear shoes, the latter being indicated at 74. The working faces of shoes 74 are undercut and inclined much as in the two embodiments of the invention already described. Between the proximate ends of wedging elements 65 and 72, narrow spaces 75 occur in the three- and nine-o'clock positions, seen as in FIGURE 9.

A fourth embodiment of the invention is shown in FIGURES 11 to 14, wherein the main and auxiliary gear members are designated 77 and 78, respectively. Screws 79, of which there are three, serve to hold them together. Arcuate wedging elements are used, two on main gear member 77 and two on auxiliary gear member 78. The wedging elements on the main gear member, designated 80, are provided with slightly angled surfaces 81 in the three- and nine-o'clock positions, seen as in FIGURE 12. Pins 82 hold wedging elements 80 to main gear member 77. On auxiliary gear member 78 are two wedging elements 83, likewise provided in the three- and nine-o'clock positions with slightly angled surfaces 84. Pins 85 hold wedging elements 83 to auxiliary gear member 78.

Angled surfaces 81 and 84 on the ends of wedging elements 80 and 83 are not undercut but extend normally to the general plane of the gear as a whole. The relationship between them is such that the angle *b* seen in FIGURE 12 is of the order of 12°, although it may be less if desired. Where such a relationship obtains, the locking component will lodge and remain locked in place on the opposed surfaces 81 and 84. This is so regardless of the direction of rotation of the gear and without regard to the fact that at a given time the gear may be stationary.

In this embodiment of the invention, the locking components take the form of rollers 89, although if preferred locking balls may be used instead. The backing assembly for rollers 89 includes blind bores 86 drilled in main gear member 77, coil springs 87, and keepers 88 formed as shown in FIGURE 14. In the spaces 90 on the opposite sides of rollers 89 a suitable tool may be brought to bear against them for the purpose of forcing them out of locked position. Such a tool may be introduced and manipulated through semi-cylindrical chambers 91 and 92 and radially extending access openings 93 in the flanged portions of the main and auxiliary gear members.

Figure 15:
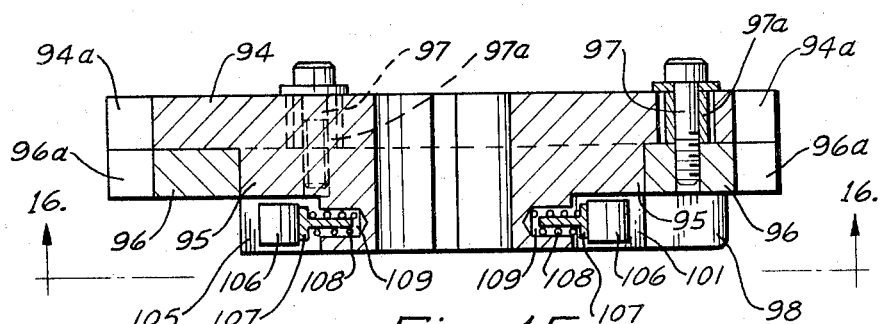
Figure 16:
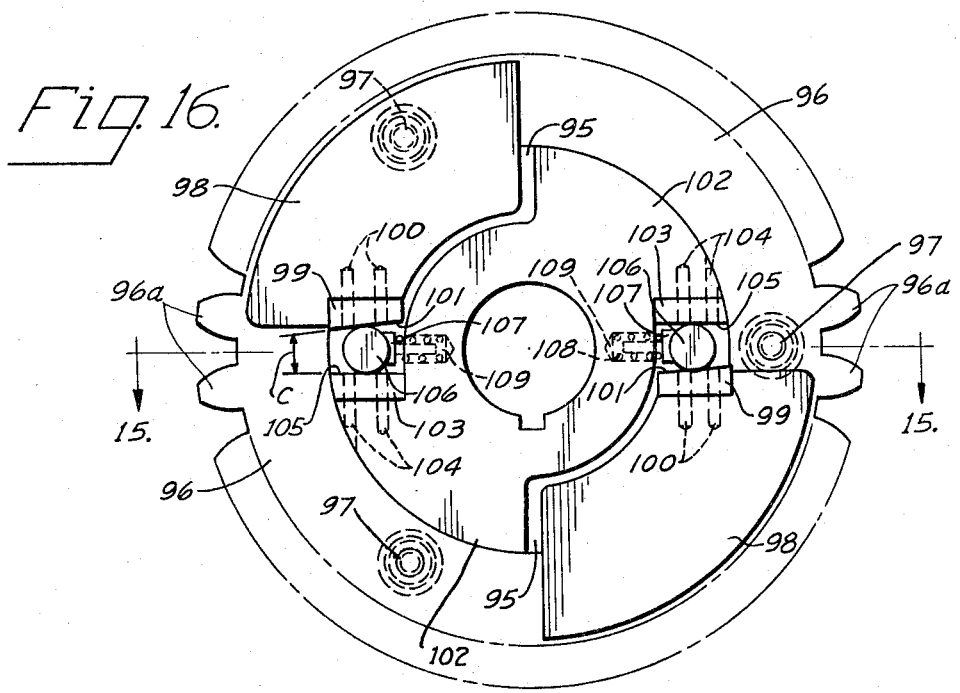
FIGURE 16 is a bottom plan of the anti-backlash gear shown in section in FIGURE 15.

A fifth embodiment of the invention, one wherein the wedging members are formed integrally with the main and auxiliary gear members, is shown in FIGURES 15 and 16. Main gear member 94, in which are formed teeth 94a, is provided on its lower side with a depending hub 95. Auxiliary gear member 96, in which are formed 96a, preferably surrounds hub 95 in the manner illustrated in FIGURE 15. Three screws 97 the heads of which bear against metal washers on the upper face of main gear member 94 hold the two gear members together. Screws 97 may advantageously be encompassed by sleeve-like spacers 97a that are slightly oversize (elongated).

Segmental wedging members 98, massive in construction and arcuate in shape, are formed integrally with and depend from the lower face of auxiliary gear member 96. Seen as in FIGURE 16, wedging members 98 are provided in the three- and nine-o'clock positions with hard metal shoes 99. Pins 100 are used to hold such shoes in place. The working faces of these shoes, designated 101, are not undercut but are angled much as are the corresponding faces in the last-described embodiment of the invention. They constitute surfaces against which the locking components can wedge to the end of eliminating backlash.

Segmental wedging member 102, which is of the two-ended type, is shaped as shown in FIGURE 16. Formed integrally with and depending from the lower face of hub 95 on main gear member 94, it is provided with two hard metal shoes 103 disposed in apposition to shoes 99 on arcuate wedging members 98. The working surfaces of shoes 103 are neither undercut nor angled but perpendicular to the lower face of the gear. They are offset from but parallel to view line 15—15 in FIGURE 16. Angle *c*, indicated in the same figure, preferably measures about 9° but may be less if desired.

In the anti-backlash mechanism shown in FIGURES 15 and 16 the locking components take the form of rollers 106. They could, if desired, take the form of locking balls. Rollers 106 are backed by keepers 107 which are themselves backed by coil springs 108 housed in radial bores 109 in hub 95 of main gear member 94. Keepers 107 are similar in shape and function to the keepers 88 of FIGURE 14. The action is one in which rollers 106 wedge in place and thereafter tenaciously maintain their wedged positions between the working surfaces of shoes 99 and 103.

Figure 17:
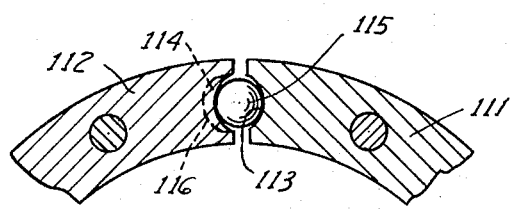

A modified type of anti-backlash mechanism, one making use of locking balls, is shown in somewhat diagrammatic fashion in FIGURE 17. In this form of the invention, segmental wedging members 111 and 112 of arcuate shape are employed much as in the anti-backlash mechanisms appearing in FIGURES 6 and 9. Each has a hardened end with a semi-circular guide channel (113, 114) for locking ball 115. Whereas the end face of wedging member 111 is perpendicular to the general plane of the gear, the end face of wedging member 112 is undercut and inclined as indicated by dotted line 116 marking the concealed edge of guide channel 114. The action is substantially the same as in the various anti-backlash mechanisms already described.

The fact that a variety of different embodiments have been disclosed should make it clear that the present invention is susceptible of numerous variations and of incorporation in gears of widely different constructions. Although in almost all cases it will be possible and in many cases desirable to use detachable wedging elements, as in the several of the above-disclosed embodiments of the invention, in others it will be desirable to use integrally formed wedging members as exemplified by those appearing in FIGURES 15 and 16. As a rule, the latter type of construction, although at times relatively expensive, has certain advantages, particularly in that it is extremely sturdy, comprised of a minimum number of parts, and characterized by ease of access to the anti-backlash mechanism. These advantages favor its use in certain circumstances and where this is so it may be expected to become the preferred type.

The drawings also show two of perhaps several different ways in which the gear members may be secured to each other without foreclosing all possibility of providing the restricted relative motion between them that is required by the needs of the anti-backlash mechanism itself. Without introducing excessive freedom of movement, it is important that highly limited rotary movement between the gear members should be possible. Representative ways of accomplishing this end are to be found in end-backed screws of the type shown in FIGURES 1, 5, 8 and 11 and in the fastening means illustrated in FIGURE 15 wherein spacers that are very slightly oversize (i.e., elongated) encompass the screws. Both permit development of the very limited rotary movement necessary to take up backlash; however, the use of other types of fastening devices capable of producing comparable results is not precluded.

Changes in certain of the other features characterizing the gears illustrated in the accompanying drawings may likewise be made without departing from the spirit of the invention. Among such are features having to do with specific ways and means for securing the wedging members to gear members. It is not necessary, for example, that retaining pins, if employed, be held in place in the gear and/or wedging members by a driven or frictional fit, for a variety of other techniques for affixing them thereto are readily available, including resistance and induction welding. Alternatively, in lieu of pins, means such as rivets may be used if desired for coupling the wedging members to the gear members. Numerous other changes of like nature may be expected to be made as a matter of routine by those skilled in the art to which the invention relates.

It is intended that the patent shall cover, by summarization in appended claims, all features of patentable novelty residing in the invention.

What is claimed is:

1. A self-contained sectional gear with built-in provision for substantially completely eliminating backlash comprising a main gear member; an auxiliary gear member coupled thereto; a plurality of segmental wedging elements of which there is at least one that is fixedly associated with the main gear member and at least one that is fixedly associated with the auxiliary gear member; juxtaposed surfaces on adjacent portions of said segmental wedging elements, said juxtaposed surfaces leaving a wedge-shaped space therebetween; a locking component in the wedge-shaped space so formed, the locking portion of said locking component comprising a surface of revolution; and means biasing said locking component into a tenaciously maintained locking position in which it is at all times in intimate contact with both of said juxtaposed surfaces.

2. A sectional gear according to claim 1 wherein the main gear member has two wedging elements fixedly associated with it.

3. A sectional gear according to claim 1 wherein the auxiliary gear member has two wedging elements fixedly associated with it.

4. A sectional gear according to claim 1 wherein each of the main and auxiliary gear members has two wedging elements fixedly associated with it.

5. A sectional gear according to claim 1 wherein the main and auxiliary gear members have three wedging elements fixedly associated with them, two with the main gear member and one with the auxiliary gear member.

6. A sectional gear according to claim 1 wherein the main and auxiliary members have three wedging elements fixedly associated with them, one with the main gear member and two with the auxiliary gear member.

7. A sectional gear according to claim 1 wherein the wedging elements respectively associated with the main and auxiliary gear members are formed integrally with them.

8. A sectional gear according to claim 1 wherein all of the wedging elements associated with the main and auxiliary gear members are of arcuate shape.

9. A self-contained sectional gear with built-in provision for substantially completely eliminating backlash comprising a main gear member; an auxiliary gear member coupled thereto; two wedging elements rigidly associated with the main gear member; at least one wedging element rigidly associated with the auxiliary gear member; juxtaposed surfaces on adjacent portions of said wedging elements, said juxtaposed surfaces leaving wedge-shaped spaces therebetween; locking components in each of such wedge-shaped spaces, the operative surfaces of said locking components comprising surfaces of revolution; and coil springs biasing said locking components into tenaciously held positions in which, regardless of whether the gear is rotating, they are at all times in engagement with said juxtaposed surfaces.

10. A sectional gear according to claim 9 wherein the wedge-shaped spaces between said juxtaposed surfaces are essentially of the nature of dihedral angles measuring between about 1° and about 12°.

11. A sectional gear according to claim 9 wherein at least half of said juxtaposed surfaces are planar.

12. A sectional gear according to claim 9 wherein at least half of said juxtaposed surfaces are provided with means for guiding said locking components.

13. A sectional gear according to claim 9 wherein semi-circular guide channels for said locking components are formed in at least half of said juxtaposed surfaces.

14. A sectional gear according to claim 9 wherein the locking components take the form of balls.

15. A sectional gear according to claim 9 wherein the locking components take the form of rollers.

16. A split gear with provision for reduction of backlash comprising a main gear member; an auxiliary gear member coupled thereto; a plurality of wedging elements of which a first is rigidly associated with said main gear member and a second is rigidly associated with said auxiliary gear member; opposed surfaces of which at least one is planar formed in said wedging elements; a locking element between said opposed surfaces, the functioning portion of said locking element taking the form of a surface of revolution; and means biasing said locking element into what for all normal purposes is a permanently locked position between said wedging elements.

17. A split gear with provision for reduction of backlash comprising a main gear member; an auxiliary gear member coupled thereto; a plurality of wedging elements of which a first is rigidly associated with said main gear member and a second is rigidly associated with said auxiliary gear member; opposed surfaces of which at least one is planar formed in said wedging elements; a spherical locking element between said opposed surfaces; and means biasing said locking element into what for all normal purposes is a locked position between said wedging elements.

18. A split gear with provision for reduction of backlash comprising a main gear member; an auxiliary gear member coupled thereto; a plurality of wedging elements of which a first is rigidly associated with said main gear member and a second is rigidly associated with said auxiliary gear member; opposed surfaces of which at least one is planar formed in said wedging elements; a cylindrical locking element between said opposed surfaces; and means biasing said locking element into what for all normal purposes is a locked position between said wedging elements.

References Cited by the Examiner

UNITED STATES PATENTS

| 1,558,222 | 10/1925 | Beetow | 74—440 |
| 1,750,679 | 3/1930 | Mitchell | 74—440 |
| 2,061,684 | 11/1936 | Spence | 74—440 |
| 3,035,454 | 5/1962 | Luning | 74—440 |

DAVID J. WILLIAMOWSKY, *Primary Examiner.*

L. H. GERIN, *Assistant Examiner.*